United States Patent [19]

Paramythioti

[11] Patent Number: 4,956,552
[45] Date of Patent: Sep. 11, 1990

[54] APPARATUS FOR EFFECTING THE SWEEP OF A BEAM OF LIGHT STRICTLY PLANE AND PARALLEL TO A GIVEN AXIS

[75] Inventor: Michel Paramythioti, Lamorlaye, France

[73] Assignee: Societe a Responsabilite Limitee dite MENSI, Paris, France

[21] Appl. No.: 352,864

[22] Filed: May 17, 1989

[30] Foreign Application Priority Data

May 19, 1988 [FR] France ............... 88 06702

[51] Int. Cl.⁵ ............................. G02B 26/02
[52] U.S. Cl. ................... 250/236; 350/6.91
[58] Field of Search ............ 250/234, 235, 236; 350/6.9, 6.91, 6.5; 358/494, 497

[56] References Cited

U.S. PATENT DOCUMENTS

| | | | |
|---|---|---|---|
| 3,493,282 | 2/1970 | Rolon | 350/7 |
| 3,881,107 | 4/1975 | Bory | 250/234 |
| 4,002,830 | 1/1977 | Brown | 358/293 |
| 4,256,364 | 3/1981 | Minoura et al. | 350/6.9 |
| 4,602,154 | 7/1986 | Kanaguchi | 250/227 |
| 4,847,492 | 7/1989 | Houki | 250/235 |

Primary Examiner—David C. Nelms
Assistant Examiner—George Beck
Attorney, Agent, or Firm—Schweitzer & Cornman

[57] ABSTRACT

The invention relates to an apparatus for effecting the sweep of a beam of light stricly plane and parallel to a given axis, comprising a sweeping mirror, mounted on an axis of rotation substantially perpendicular to the said given axis, and the plane of which substantially contains the said axis of rotation, and an optical device arranged substantially in the plane containing the said given axis of rotation. It comprises a first means of adjustment for adjusting the angle of incidence of the beam of light with respect to a predetermined plane passing through the said given axis and substantially perpendicular to the said axis of rotation of the mirror, and a second means of adjustment for adjusting the inclination of the axis of rotation of the mirror with respect to the said predetermined plane.

6 Claims, 2 Drawing Sheets

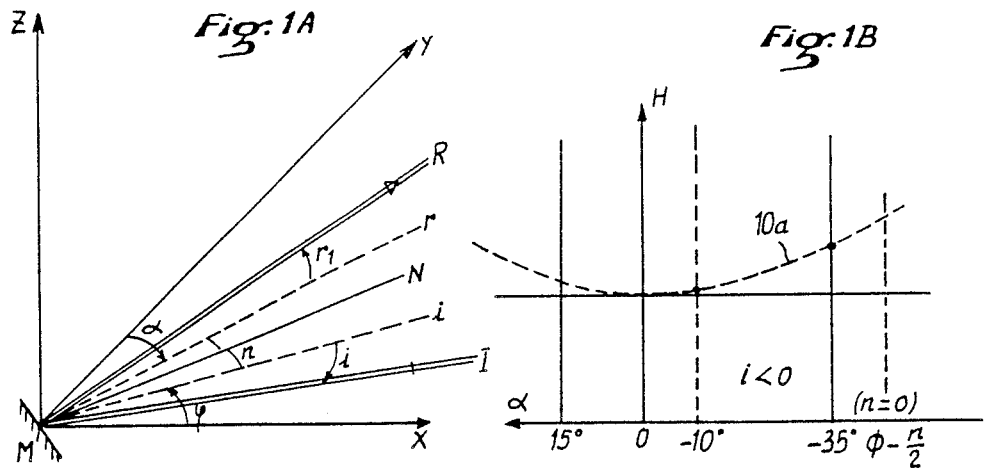
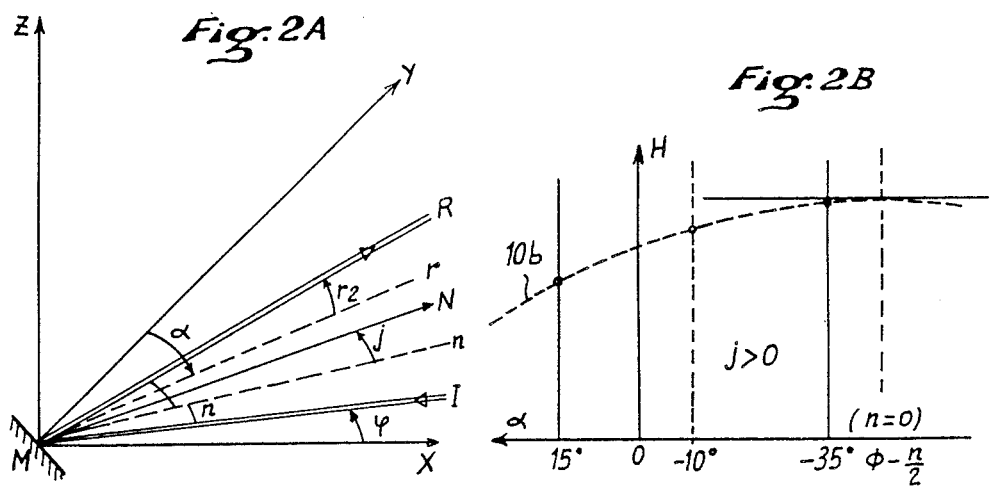
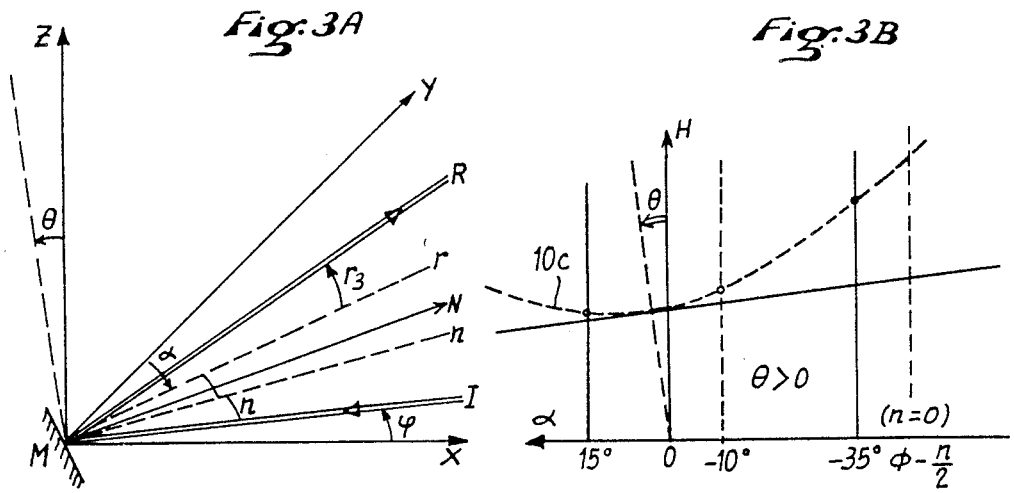

APPARATUS FOR EFFECTING THE SWEEP OF A BEAM OF LIGHT STRICTLY PLANE AND PARALLEL TO A GIVEN AXIS

BACKGROUND OF THE INVENTION

The present invention concerns an apparatus for effecting the sweep of a beam of light strictly plane and parallel to a given axis and, more particularly, such an apparatus comprising a sweeping mirror, mounted on an axis of rotation substantially perpendicular to the said given axis and the plane of which substantially contains the said axis of rotation, and an optical device, such as a source of light, arranged substantially in the plane containing the said given axis and perpendicular to the axis of rotation.

Such apparatuses are already well known in the prior art. Thus the French patent application filed on Feb. 4, 1987 under No. 87.01360 describes an apparatus involving the sweep of a scene observed by successive lines, by means of a laser beam reflected by a mirror pivoting about an axis under the effect of a galvanometer.

It frequently happens to be necessary, in the course of sweeping, for the beam of light to remain contained in one and the same plane parallel to a given axis.

This is the case, in particular, in the abovementioned patent application, where the laser beam forms a spot of light in a given location of the scene, and where the image of this spot is formed on a small bar of photosensitive elements. It is therefore important that the image of the said spot be perfectly centered on each element of the bar, and consequently that the sweep be perfectly plane and that the plane of sweep be parallel to the axis of the bar.

The desired precision for this apparatus is of the order of several seconds of an arc for the angle of elevation of the reflected beam.

Inversely, it may be desired to make use of an apparatus comprising a photosensitive receiver, and to receive on this receiver only the light coming from a certain plane parallel to a given axis, effecting the sweep of this plane by means of a swiveling mirror reflecting the light coming from the said plane to the photosensitive receiver.

Now, three sources of curvature of the plane of sweep are possible in an apparatus designed as described above.

First of all, the source of light or the photosensitive receiver may be located slightly above or below the plane containing the given axis perpendicular to the axis of rotation, i.e., the beam of light does not have a zero incidence with regard to the said plane.

In addition, sweeping mirrors are cemented to their axis of rotation so that, in theory, the plane of the mirror passes through this axis. In practice, it proves impossible to find mirrors respecting this condition with the desired precision which may attain an arc of several seconds: commercial galvanometric mirrors, as a matter of fact, exhibit defects of parallelism with their axis which may exceed an arc of 20 minutes.

Finally, the axis of rotation of the mirror itself may not be strictly perpendicular to the given axis.

It is understood that, if the aforementioned first and third defects may be limited by careful construction of the apparatus, the same does not apply to the second defect, which is inherent in the mirror itself.

SUMMARY OF THE PRESENT INVENTION

The present invention aims to furnish a device making it possible to remedy these three defects and, more particularly, the second one, i.e., to obtain a sweep in a plane parallel to a given axis, by using a mirror imperfectly cemented on its axis of rotation.

For this purpose, the object of the invention is an apparatus to effect the sweep of a beam of light strictly plane and parallel to a given axis, comprising a sweeping mirror, mounted on an axis of rotation substantially perpendicular to the said given axis, and the plane of which substantially contains the said axis of rotation, and an optical device, such as a source of light or a photosensitive receiver, arranged substantially in the plane containing the said given axis and perpendicular to the said axis of rotation, characterized in that it comprises a first means of adjustment for adjusting the angle of incidence of the beam of light issuing from the said device with respect to a predetermined plane passing through the said given axis and essentially perpendicular to the said axis of rotation of the mirror, and a second means of adjustment for adjusting the inclination of the axis of rotation of the mirror with respect to the predetermined plane.

It will be noted that these first and second adjustments correspond in initial approximation to the corrections to be applied to the abovementioned first and third defects.

Now the applicants have found that, surprisingly, these two adjustments by themselves make it possible to practically completely eliminate the three defects and, especially, the second one, i.e., the one related to cementing of the mirror on its axis of rotation.

In a particular embodiment of the invention, the said first means of adjustment comprises a first pivoting structure of adjustable inclination about the said given axis, the optical device being mounted on this first pivoting structure.

Likewise according to a particular embodiment of the invention, the said second means of adjustment comprises a second structure pivoting about an axis of adjustment substantially contained in the said predetermined plane, the axis of rotation of the mirror being mounted on this second pivoting structure.

More particularly, this axis of adjustment may be essentially perpendicular to the said given axis.

A particular embodiment of the invention is now described by way of non-limitative example, with reference to the accompanying schematic drawings wherein:

DESCRIPTION OF DRAWINGS

FIGS. 1A, 2A and 3A each illustrate one of the three aforementioned defects of apparatuses of the prior art, FIGS. 1B, 2B and 3B represent the result of each of these defects on a screen arranged at a certain distance from the apparatus, parallel to the given axis and to the axis of rotation of the mirror.

In FIGS. 1A, 2A and 3A,

Figure 4:
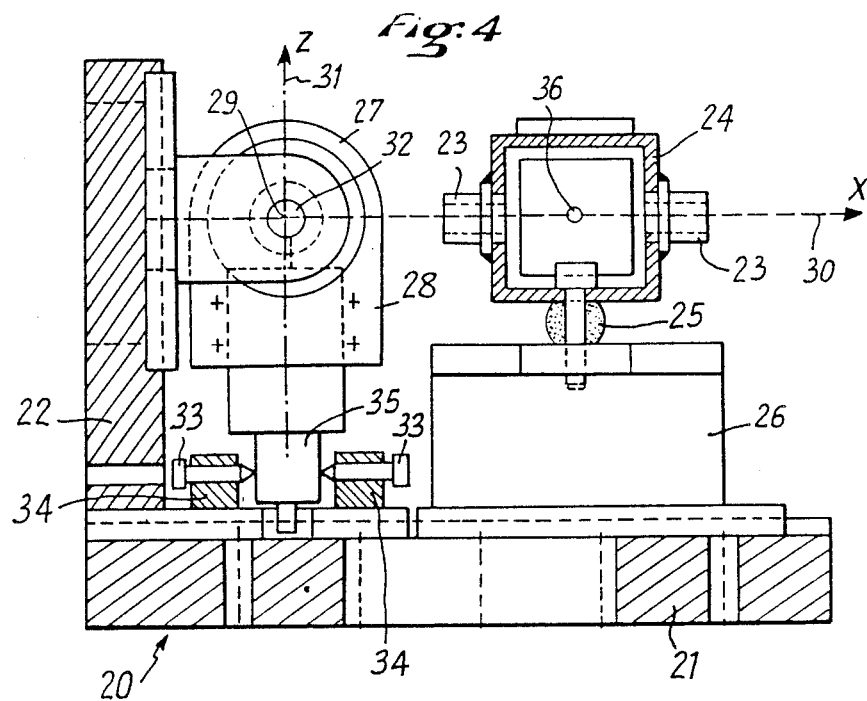
FIG. 4 is a view in elevation partially in section of an apparatus according to the invention.

M designates the sweeping mirror,

MXYZ, a basic trirectangular trihedron, connected to the device, and such that MX is the given axis parallel to which it is desired to effect the sweep, and that the plane XMY is the theoretical plane of sweep, MZ being the theoretical axis of rotation of the mirror.

IM, the incident beam,

MR, the reflected beam,

MN, the normal to the mirror, iM, the projection, if any, of the incident beam IM in the plane XMY, Mr, the projection, if any, of the reflected beam MR in the plane XMY, Mn, the projection, if any, of the normal to the mirror MN in the plane XMY, $\phi$, the angle of azimuth of the incident beam IM, $\alpha$, the complement of the angle of azimuth of the reflected beam MN, n, the angle formed between the incident beam IM (or its projection iM) with the normal to the mirror MN (or its projection Mn), i, the angle of elevation of the incident beam IM with respect to the plane XMY, j, the angle formed by the normal to the mirror MN and the plane XMY, $\theta$, the angle formed by the axis of rotation of the mirror with the axis MZ, in the plane XMZ.

FIG. 1A illustrates the first possible defect, i.e., a non-zero incidence i of the incident beam IM, with respect to the plane XMY. The resulting error is a spurious angle of elevation $r_1$ of the reflected beam MR.

FIG. 2A illustrates the second defect, i.e., a non-zero angle j between the plane of the mirror and its axis of rotation (cementing defect). The resulting error is a spurious angle of elevation $r_2$ of the reflected beam MR.

FIG. 3A illustrates the third defect, i.e., a non-zero angle between the axis of rotation of the mirror and the axis MZ. The resulting error is a spurious angle of elevation $r_3$ of the reflected beam MR.

FIGS. 1B, 2B, 3B show the curves followed by a spot of light resulting from interception of the reflected beam MR by a screen perpendicular to the axis MY, placed at a certain distance from the mirror M, i.e., by the trace of the reflected beam MR in the plane of this screen, when the mirror turns about its axis of rotation, i.e., when $\alpha$ varies. The axis OH is the axis of the screen contained in the plane YMZ.

The curve 10a of FIG. 1B shows the lack of inherent flatness of the sweep resulting from a non-zero angle i when the angle $\alpha$ (equal to $\phi + 2n = 90°$) varies. It can be shown that this curve is a hyperbola whose axis is vertical and situated in the plane YMZ.

Curve 10b of FIG. 2B represents the lack of inherent flatness due to a non-zero angle j when the angle varies. It can be shown that this curve is a sine-shaped arc attaining its maximum for n=0, i.e., an "inclined" arc for normal values of the angle n.

Lastly, the curve 10c of FIG. 3B shows the lack of inherent flatness resulting from a non-zero angle $\theta$. It can be shown that this curve is a hyperbola whose axis is inclined at an angle $\theta$ with respect to the plane XMZ.

The invention consists essentially in having rendered the angles i and $\theta$ adjustable to any indeterminate value, instead of trying to reduce them, by construction of the device, to a fixed value as close as possible to zero.

Figure 5:
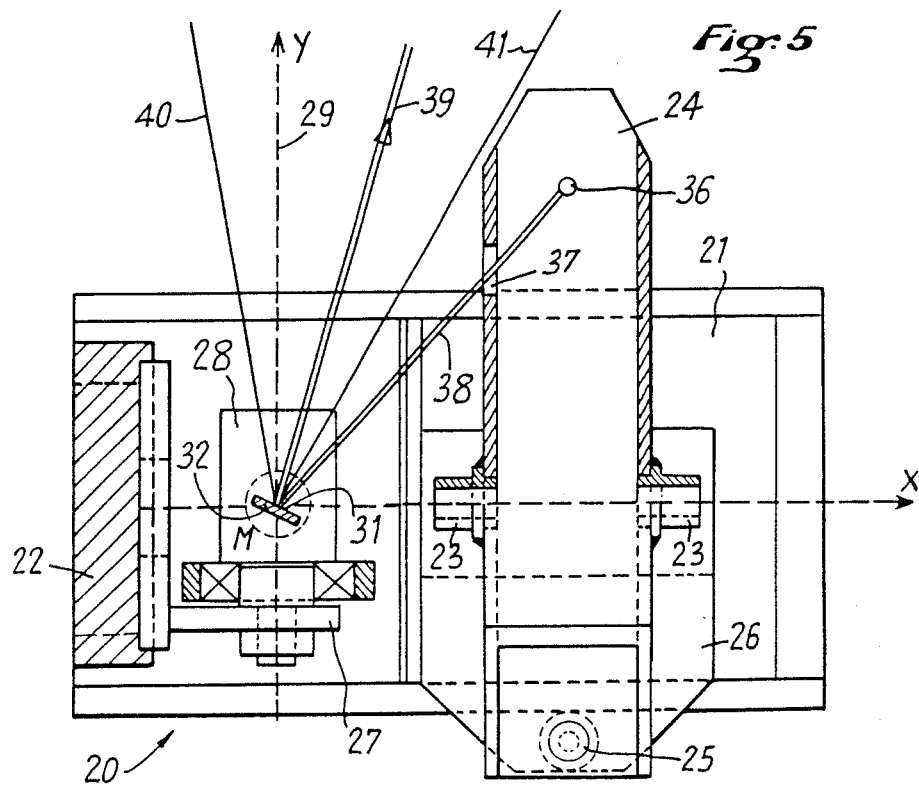
FIG. 5 is a top view, likewise partially in section.

The device according to the invention, represented in FIGS. 4 and 5, comprises a frame 20 formed of a bed 21 and an upright 22.

The bed 21 accommodates, in bearings not represented, the rotating shafts 23 of a pivoting structure 24, designed, in the present case, in the form of a tube square in cross-section. The axis 30 of the bearings is substantially parallel to the given axis parallel to the one on which it is desired to effect the sweep.

An adjusting screw 25, cooperating with a thread formed in a support 26 integral with the bed 21, makes it possible to adjust the inclination of the structure 24 about the shafts 23.

The upright 22 accommodates in a bearing 27 a second structure 28, pivoting about an axis 29 substantially coplanar and perpendicular to the axis 30 of the shafts 23.

The pivoting structure 28 accommodates the axis of rotation 31 of a mirror 32 which may be caused to rotate by a galvanometer (not represented) likewise mounted on the structure 28.

The inclination of the structure 28 about the axis may be adjusted by means of adjusting screws 33, forming stops, mounted in members 34 integral with the bed 21 and cooperating with an extension 35 of the pivoting structure 28.

The axis of rotation 31 is mounted approximately perpendicular to the axis 30 for an average value of the adjustment 33.

A laser emitter 36 is mounted in the tube 24, approximately in the plane passing through the axis 30 and perpendicular to the axis of rotation 31 of the mirror for an average value of the adjustments 25 and 33. A window 37 formed in this tube makes it possible to illuminate the mirror 32 from this emitter.

When the mirror 32 pivots under the effect of the galvanometer, the beam of light 38 issuing from the diode 36 is reflected at 39 on the mirror 32 and effects a sweep between two field limits 40 and 41. This sweep is effected practically in a plane parallel to the axis 30, subject to a suitable adjustment of the screws 25 and 33.

One recognizes in the axis 30 the axis MX of FIGS. 1A, 2A and 3A, and in the axis 29 approximately the axis MY. The axis 31 is approximately combined with the axis MZ only for a given value of adjustment of the screws 33.

However, the essential difference from what was described above is that the angles of rotation of the structures 24 and 28 about the axes 29 and 30 are not errors as were the angles i and of FIGS. 1A and 3A, but adjustment values of the device.

In addition, it will be noted that there is no reference, or no zero, for these angles of rotation, which are defined only by their variations in one direction or in another. The relative positioning of the axes 29 and 30, which alone might constitute a reference, is in effect much too rough for the desired precision.

Adjustment is made by successive approximations, using a ruler, arranged at a certain distance from the device parallel to the axis 30, and on which is mounted a bidirectional pickup sliding along the ruler. This pickup makes it possible to measure at various points of the ruler the height of the beam above or below the plane determined by the axes 29 and 30.

Tables 1 to 4 below show the results of a simulation of such adjustments.

In this simulation it was assumed that the defect of cementing of the mirror on its axis, i.e., the angle j, was equal to an arc of 25 minutes, that the angle $\phi$, i.e., the angle between the beam 38 and the axis 30, was equal to 45°, and that the aforesaid ruler was arranged at a distance D=4.60 m from the axis 30.

The field of sweep was assumed to comprise between $+15°$ and $-35°$, i.e., that the limits 40 and 41 make angles of 15° and 35° respectively with the axis 29.

These tables successively give for different values of the angle in degrees:

the corresponding values of n in degrees and in radians, the values of the angles $r_1$, $r_2$ and $r_3$ in milliradians, the value of the sum $r_1+r_2+r_3$ in milliradians, the height $rD/\cos\alpha$ in millimeters of the beam of light above the ruler, the equivalent height $r_0D/\cos\alpha$ in microns after rotation of the apparatus about the axis 30, so as to take this height at the center of the field back to zero and the value in seconds of an arc of the angle $r_0$, characteristic of the lack of inherent flatness of the beam.

It was arbitrarily assumed that the angles i and $\theta$ of departure had a zero value, so that, in Table 1, the angles $r_1$ and $r_3$ are likewise equal to zero.

It is found in the said Table 1 that the defect of cementing of the mirror creates a very great lack of inherent flatness, since the beam of light deviates from its median value, taken as reference, of $-108.42$ seconds of an arc at one of the ends of the field, and of $+609.30$ seconds of an arc at the other end of the field, which corresponds to more than 2 centimeters of deviation in height at the level of the ruler.

Table 5 shows on which parameter i or $\theta$ to act, and in what direction, as a function of the direction of the error at each end of the field after taking the error at the center of the field back to zero.

In the case of Table 1, $r_0$ varies from a negative value to a positive value, so that it is appropriate to apply a negative correction to the angle $\theta$.

Hence a correction equal to $-10$ minutes of an arc was applied to $\theta$.

It is already found in Table 2 that this results in a distinct improvement in the inherent flatness, since the beam never deviates more than 280.13 seconds of an arc from its median value, which corresponds to a height of less than 8 millimeters at the level of the ruler.

Since in this case $r_0$ varies from one positive value to another positive value, Table 5 shows that it is appropriate to apply a positive correction to the angle i.

Table 3 shows the result obtained with a correction of $+28$ minutes of an arc to the angle i.

The deficiency in inherent flatness is now no more than of the order of 13 seconds of an arc, i.e., about 300 microns at the level of the ruler.

Since $r_0$ now varies from a positive value to a negative value, Table 5 shows that a positive correction should be applied to $\theta$.

The following stages have not been illustrated, but Table 4 gives the final result with a positive correction of 28.80 minutes of an arc to the angle i and a negative correction of 9.64 minutes of an arc to the angle $\theta$.

The angular error is only of the order of 2 seconds of an arc, or about 50 microns at the level of the ruler.

This simulation shows that it is therefore possible, thanks to the invention, to take the deficiency in inherent flatness back to a value of the order of several seconds of an arc, despite a defect in cementing of the mirror of 25 minutes of an arc.

TABLE 1

| (i = 0; Θ = 0) | | | | | | | |
|---|---|---|---|---|---|---|---|
| $\alpha$ (°) | 15 | 10 | 0 | $-10$ | $-20$ | $-30$ | $-35$ |
| n (°) | 30 | 27.5 | 22.5 | 17.5 | $-12.5$ | 7.5 | 5 |
| (rad) | 0.52 | 0.48 | 0.39 | 0.31 | 0.22 | 0.13 | 0.09 |
| $r_1$ (mrad) | 0 | 0 | 0 | 0 | 0 | 0 | 0 |
| $r_2$ (mrad) | 12.62 | 12.93 | 13.47 | 13.90 | 14.23 | 14.45 | 14.52 |
| $r_3$ (mrad) | 0 | 0 | 0 | 0 | 0 | 0 | 0 |
| r (mrad) = $r_1 + r_2 + r_3$ | 12.62 | 12.93 | 13.47 | 13.90 | 14.23 | 14.45 | 14.52 |
| $rD/\cos\alpha$ (mm) | 60.12 | 60.40 | 61.95 | 64.94 | 69.67 | 76.77 | 81.55 |
| $r_0D/\cos\alpha$ ($\mu$) | $-4818$ | $-4542$ | $-2987$ | 0 | 4729 | 11828 | 16610 |
| $r_o$ ($\mu$) | $-208.42$ | $-200.31$ | $-133.78$ | 0 | 199.00 | 458.73 | 609.30 |

TABLE 2

| (1 = 0; Θ = $-10'$) | | | | | | | |
|---|---|---|---|---|---|---|---|
| $\alpha$ (°) | 15 | 10 | 0 | $-10$ | $-20$ | $-30$ | $-35$ |
| n (°) | 30 | 27.5 | 22.5 | 17.5 | 12.5 | 7.5 | 5 |
| (rad) | 0.52 | 0.48 | 0.39 | 0.31 | 0.22 | 0.13 | 0.09 |
| $r_1$ (mrad) | 0 | 0 | 0 | 0 | 0 | 0 | 0 |
| $r_2$ (mrad) | 12.62 | 12.93 | 13.47 | 13.90 | 14.23 | 14.45 | 14.52 |
| $r_3$ (mrad) | $-1.31$ | $-1.56$ | $-2.06$ | $-2.57$ | $-3.06$ | $-3.52$ | $-3.73$ |
| r (mrad) = $r_1 + r_2 + r_3$ | 11.32 | 11.37 | 11.41 | 11.33 | 11.17 | 10.93 | 10.79 |
| $rD/\cos\alpha$ (mm) | 5.90 | 53.13 | 52.47 | 52.94 | 54.69 | 58.07 | 60.58 |
| $r_0D/\cos\alpha$ ($\mu$) | 952 | 187 | $-476$ | 0 | 1750 | 5129 | 7636 |
| $r_o$ ($\mu$) | 41.17 | 8.27 | $-21.33$ | 0 | 73.65 | 198.92 | 280.13 | negative correction to the angle $\theta$.

TABLE 3

| (i = 28'; Θ = $-10'$) | | | | | | | |
|---|---|---|---|---|---|---|---|
| $\alpha$ (°) | 15 | 10 | 0 | $-10$ | $-20$ | $-30$ | $-35$ |
| n (°) | 30 | 27.5 | 22.5 | 17.5 | 12.5 | 7.5 | 5 |
| (rad) | 0.52 | 0.48 | 0.39 | 0.31 | 0.22 | 0.13 | 0.09 |
| $r_1$ (mrad) | $-8.16$ | $-8.16$ | $-8.16$ | $-8.16$ | $-8.16$ | $-8.16$ | $-8.16$ |
| $r_2$ (mrad) | 12.62 | 12.93 | 13.47 | 13.90 | 14.23 | 14.45 | 14.52 |
| $r_3$ (mrad) | $-1.31$ | $-1.56$ | $-2.06$ | $-2.57$ | $-3.06$ | $-3.52$ | $-3.73$ |

TABLE 3-continued

| (i = 28'; Θ = −10') | | | | | | | |
|---|---|---|---|---|---|---|---|
| r (mrad) = $r_1 + r_2 + r_3$ | 3.15 | 3.21 | 3.24 | 3.17 | 3.01 | 2.77 | 2.68 |
| rD/cos α (mm) | 15.02 | 15.00 | 14.92 | 14.81 | 14.73 | 14.71 | 14.74 |
| $r_0$D/cos α (μ) | 206 | 187 | 103 | 0 | −81 | −101 | −75 |
| $r_0$ (μ) | 8.93 | 8.27 | 4.61 | 0 | −3.39 | −3.91 | −2.74 |

TABLE 4

| (i = 28.80'; Θ = −9.64') | | | | | | | |
|---|---|---|---|---|---|---|---|
| α (°) | 15 | 10 | 0 | −10 | −20 | −30 | −35 |
| n (°) | 30 | 27.5 | 22.5 | 17.5 | 12.5 | 7.5 | 5 |
| (rad) | 0.52 | 0.48 | 0.39 | 0.31 | 0.22 | 0.13 | 0.09 |
| $r_1$ (mrad) | −8.40 | −8.40 | −8.40 | −8.40 | −8.40 | −8.40 | −8.40 |
| $r_2$ (mrad) | 12.62 | 12.93 | 13.47 | 13.90 | 14.23 | 14.45 | 14.52 |
| $r_3$ (mrad) | −1.26 | −1.50 | −1.99 | −2.48 | −2.95 | −3.39 | −3.60 |
| r (mrad) = $r_1 + r_2 + r_3$ | 2.97 | 3.03 | 3.08 | 3.03 | 2.89 | 2.66 | 2.53 |
| rD/cos α (mm) | 14.13 | 14.17 | 14.19 | 14.16 | 14.13 | 14.15 | 14.18 |
| $r_0$D/cos α (μ) | −23 | 17 | 29 | 0 | −26 | −9 | 28 |
| $r_o$ (μ) | −0.98 | 0.76 | 1.31 | 0 | −1.08 | −0.35 | 1.03 |

TABLE 5

| $r_0$ | − + | + − | + + | − − |
|---|---|---|---|---|
| Correction i | 0 | 0 | + | − |
| Correction Θ | − | + | 0 | 0 |

I claim:

1. Apparatus for effecting a strictly planar and parallel to a given axis scanning a beam of light comprising:
   (a) a scanning mirror having an axis of rotation substantially perpendicular to said given axis and having its plane substantially containing said axis of rotation;
   (b) an optical device arranged substantially in the plane containing said given axis and perpendicular to said axis or rotation;
   (c) first adjustment means for adjusting the angle of incidence of the beam of light with respect to a predetermined plane containing said given axis and substantially perpendicular to said axis of rotation of the mirror; and
   (d) second adjustment means for adjusting the inclination of said axis of rotation of the mirror with respect to said predetermined plane.

2. Apparatus according to claim 1, characterized in that the said optical device is a source of light.

3. Apparatus according to claim 1, characterized in that the said optical device is a photosensitive receiver.

4. Apparatus according to any of claims 1, characterized in that the said first means of adjustment comprises a first pivoting structure, adjustable in inclination about the said given axis, the optical device being mounted on this first pivoting structure.

5. Apparatus according to any of claims 1, characterized in that the said second means of adjustment comprises a second structure (28) pivoting about an axis of adjustment substantially contained in the said predetermined plane, the axis of rotation of the mirror being mounted on this second pivoting structure.

6. Apparatus according to any of claims 1, characterized in that the said axis of adjustment is substantially perpendicular to the said given axis.

* * * * *